United States Patent [19]

Goertz et al.

[11] Patent Number: 4,952,558
[45] Date of Patent: Aug. 28, 1990

[54] PREPARATION OF COPOLYMERS OF ETHYLENICALLY UNSATURATED DICARBOXYLIC ANHYDRIDES AND ALKYL VINYL ETHERS

[75] Inventors: Hans-Helmut Goertz, Freinsheim; Hans-Juergen Raubenheimer, Ketsch; Walter Denzinger, Speyer, all of Fed. Rep. of Germany

[73] Assignee: BASF Aktiengesellschaft, Ludwigshafen, Fed. Rep. of Germany

[21] Appl. No.: 264,046

[22] Filed: Oct. 28, 1988

[30] Foreign Application Priority Data

Oct. 31, 1987 [DE] Fed. Rep. of Germany ....... 3736996

[51] Int. Cl.$^5$ ........................................... C08F 222/04
[52] U.S. Cl. ..................................... 526/27.1; 526/216
[58] Field of Search ................................ 526/271, 216

[56] References Cited

U.S. PATENT DOCUMENTS

| | | | |
|---|---|---|---|
| 2,894,921 | 7/1959 | Jones | 526/271 |
| 3,532,771 | 10/1970 | Field et al. | |
| 3,553,183 | 1/1971 | Field et al. | |
| 4,180,637 | 12/1979 | Evani et al. | 526/216 |
| 4,366,294 | 12/1982 | Williams et al. | 526/271 |
| 4,370,454 | 1/1983 | Messmer et al. | |
| 4,387,186 | 6/1983 | Williams et al. | 526/271 |

FOREIGN PATENT DOCUMENTS

| | | |
|---|---|---|
| 540101 | 12/1931 | Fed. Rep. of Germany . |
| 712220 | 7/1954 | United Kingdom . |
| 1063056 | 3/1967 | United Kingdom . |
| 1117515 | 6/1968 | United Kingdom . |

*Primary Examiner*—Joseph L. Schofer
*Assistant Examiner*—Alex H. Walker
*Attorney, Agent, or Firm*—Oblon, Spivak, McClelland, Maier & Neustadt

[57] ABSTRACT

Copolymers of ethylenically unsaturated dicarboxylic anhydrides and alkyl vinyl ethers are prepared by copolymerization of the monomers from which the copolymers are derived, in the presence or absence of up to 2% by weight, based on the monomers, of a crosslinking agent containing two or more ethylenically unsaturated double bonds, in the presence of a polymerization initiator in an ester of not less than 5 carbon atoms which is obtained from a saturated aliphatic carboxylic acid and a saturated monohydric alcohol, as a solvent for the monomers, by a precipitation polymerization method.

6 Claims, No Drawings

PREPARATION OF COPOLYMERS OF ETHYLENICALLY UNSATURATED DICARBOXYLIC ANHYDRIDES AND ALKYL VINYL ETHERS

Copolymers of α, β-unsaturated dicarboxylic an hydrides and vinyl ethers are usually prepared by free radical polymerization. The polymerization can be carried out in various embodiments, for example in the absence of a solvent, or by solution polymerization or precipitation polymerization. For example, U.S. Pat. No. 4,370,454 discloses the copolymerization of maleic anhydride with methyl vinyl ether without the addition of solvents in a stirred powder bed, and German Patent No. 540,101 discloses the mass polymerization of maleic anhydride with vinyl ethyl ether. British Patent No. 712,220 mentions acetone, methyl ethyl ketone and isopropyl methyl ketone as suitable solvents for solution copolymerization of maleic anhydride with vinyl alkyl ethers. The same patent describes precipitation polymerization in cycloaliphatics and monocyclic aromatics. According to British Patent No. 1,117,515, methylene chloride is used as a precipitating agent for the copolymers formed during copolymerization.

Precipitation polymerization is the most advantageous process for obtaining copolymers of α, β-unsaturated dicarboxylic anhydrides and alkyl vinyl ethers. Benzene is a particularly suitable solvent (cf. U.S. Pat. No. 3,553,183). Accordingly, it is also used in industrial processes. Benzene has the advantage that both low molecular weight and very high molecular weight products can be prepared in this solvent for the monomers and precipitating agent for the polymers.

A disadvantage of benzene is the fact that a finely divided suspension of the polymer is obtained only up to a monomer concentration of about 20% by weight; at higher concentrations, however, troublesome agglomeration occurs, leading to caking of the polymers on the stirrer and on the wall of the polymerization apparatus. There has therefore been no lack of attempts to overcome this deficiency by using suitable dispersants. For example, British Patent No. 1,063,056 discloses the use of polystyrene, butyl polyacrylate, polyvinyl isobutyl ether and various other homopolymers and copolymers as protective colloids, in order to obtain finely divided suspensions even at higher concentrations. To prevent the particles from sticking together during the copolymerization of maleic anhydride with alkyl vinyl ethers in benzene, according to U.S. Pat. No. 3,532,771 specific polyalkylene glycol vinyl ethers are used. However, it is in any case desirable to dispense with such a polymeric dispersant since it is expected to give rise to problems, depending on the subsequent use of the ready-prepared copolymer. For example, there are cases where the copolymer dissolves in water to give a clear solution but the dispersant does not because it has solubility properties differing from those of the copolymer. Polymerization in benzene gives very finely divided copolymers which have a mean particle size of about 0.05 to 0.5 μm. The finely divided copolymers isolated from the suspensions produce a very great deal of dust during handling. Moreover, benzene and halohydrocarbons, for example methylene chloride or 1,1,1-trichloroethane, in which the above-mentioned polymerizations take place as precipitation polymerizations, are physiologically unacceptable solvents.

It is an object of the present invention to provide a process for the preparation of copolymers of ethylenically unsaturated dicarboxylic anhydrides and alkyl vinyl ethers by precipitation polymerization of the monomers from which the copolymers are derived, in which process the use of physiologically unacceptable solvents is avoided and free-flowing copolymer powders which produce little dust are obtained.

We have found that this object is achieved, according to the invention, by a process for the preparation of copolymers of ethylenically unsaturated dicarboxylic anhydrides and alkyl vinyl ethers by copolymerization of (a) an ethylenically unsaturated dicarboxylic anhydride of 4 to 6 carbon atoms,
(b) a methyl vinyl ether or a mixture of methyl vinyl ether with up to 10 mol %, based on the mixture, of other alkyl vinyl ethers and
(c) from 0 to 2% by weight, based on the monomers (a) and (b), of a crosslinking agent containing two or more ethylenically unsaturated double bonds, in a solvent in which the monomers are soluble and in which the resulting copolymer is virtually insoluble, in the presence of a polymerization initiator, if the solvent used is an ester of not less than 5 carbon atoms which is obtained from a saturated aliphatic carboxylic acid and a saturated monohydric alcohol.

It was not to be expected that free-flowing copolymers which produce virtually no dust would be obtained, since the copolymerization of the monomers (a) and (b) takes place in methyl acetate by a solution polymerization method and gives polymer solutions. On the other hand, polymerization in ethyl acetate, methyl propionate and ethyl formate gives precipitation polymers, but the copolymer particles show very pronounced adhesion to one another even during the preparation and are deposited on the stirrer and on the polymerization apparatus.

Suitable components (a) for the novel process for the preparation of copolymers are monoethylenically unsaturated dicarboxylic anhydrides of 4 to 6 carbon atoms, e.g. maleic anhydride, citraconic anhydride, itaconic anhydride, ethylmaleic anhydride, dimethylmaleic anhydride and chloromaleic anhydride. Maleic anhydride is preferably used as a monomer of group (a).

A preferred monomer of group (b) is methyl vinyl ether. Mixtures of methyl vinyl ether with up to 10 mol % based on the mixture, of other alkyl vinyl ethers, e.g. ethyl vinyl ether, n-propyl vinyl ether, isopropyl vinyl ether, n-butyl vinyl ether, isobutyl vinyl ether, 2ethylhexyl vinyl ether, dodecyl vinyl ether and octadecyl vinyl ether, are also suitable. The last-mentioned alkyl vinyl ethers are used either alone or as a mixture with one another, together with methyl vinyl ether. The suitable mixtures contain up to 10, preferably up to 5, mol % of the alkyl vinyl ethers other than methyl vinyl ether. A preferably used component (b) is methyl vinyl ether. The monomers (a) and (b) are known to polymerize in a molar ratio of 1 : 1 and give strictly alternating copolymers. The monomers (a) and (b) are therefore usually used in the copolymerization in a molar ratio of 1 : 1. However, in order to achieve complete conversion of the ethylenically unsaturated dicarboxylic anhydrides in the copolymerization, methyl vinyl ether or a mixture of methyl vinyl ether with the other alkyl vinyl ethers is used in a molar excess of up to 10 mol %.

The copolymerization can, if required, also be carried out in the presence of crosslinking agents. Suitable crosslinking agents are the monomers of group (c), which are compounds which contain two or more non-conjugated ethylenically unsaturated double bonds in the molecule.

Examples of suitable crosslinking agents are N,N'-methylenebisacrylamide, polyethylene glycol diacrylates and polyethylene glycol dimethacrylates, each of which is derived from a polyethylene glycol having a molecular weight of from 126 to 8,500, trimethylolpropane triacrylate, trimethylolpropane trimethacrylate, ethylene glycol diacrylate, propylene glycol diacrylate, butanediol diacrylate, hexanediol diacrylate, hexanediol dimethacrylate, diacrylates and dimethacrylates of block copolymers of ethylene oxide and propylene oxide, polyhydric alcohols, such as glycerol or pentaerythritol, which are diesterified or triesterified with acrylic acid or methacrylic acid, triallylamine, tetraallylethylenediamine, divinylbenzene, diallyl phthalate, polyethylene glycol divinyl ether, trimethylolpropane diallyl ether, polyethylene glycol divinyl ether, butanediol divinyl ether, pentaerythritol triallyl ether and/or divinylethyleneurea. If a crosslinking agent is used in the copolymerization of the monomers of groups (a) and (b), it is employed in amounts of from 0.005 to 2, preferably from 0.05 to 1%, by weight, based on the monomers (a) and (b). However, the preparation of uncrosslinked copolymers of maleic anhydride and vinyl ethyl ether is particularly preferred.

According to the invention, esters which contain not less than 5 carbon atoms in the molecule and are obtainable from saturated aliphatic carboxylic acids and saturated monohydric alcohols are used as a solvent or reaction medium for the copolymerization. Examples of suitable alkyl carboxylates are n-butyl formate, secbutyl formate, isobutyl formate, tert-butyl formate, npropyl acetate, isopropyl acetate, butyl acetate, secbutyl acetate, isobutyl acetate, tert-butyl acetate, pentyl acetate in the various isomeric forms, ethyl propionate, n-propyl propionate, isopropyl propionate, butyl propionate in its isomeric forms, methyl butyrate, ethyl butyrate, propyl butyrate, isopropyl butyrate, methyl isobutyrate, ethyl isobutyrate, n-propyl isobutyrate and isopropyl isobutyrate. n-Propyl acetate and isopropyl acetate are very particularly preferably used. The use of esters having a total of more than 7 carbon atoms is in principle possible but has no advantages. The most commonly used suitable esters have a total of 5 or 6 carbon atoms. Mixtures of the abovementioned esters can also be used as solvents.

The concentration of the monomers in the suitable esters is up to 40, usually from 15 to 40, preferably from 20 to 35%, by weight. Since the monomers are virtually completely polymerized, the polymer suspensions obtained in the precipitation polymerization have solids contents of from 15 to 40, preferably from 20 to 35%, by weight. Whereas the use of benzene as a solvent gives polymer suspensions having a solids content of 30% by weight only when a protective colloid is also used, it is possible in the novel process to prepare 30-35% strength by weight copolymer suspensions even in the absence of protective colloids, without the polymers agglomerating or caking on the walls of the polymerization apparatus or on the stirrer. In the novel process, the copolymer is obtained in a relatively coarse-particled form, so that the copolymer particles can readily be obtained from the polymer suspension, for example by filtration. After the removal of the residual solvent still adhering to the copolymer particles, a very free-flowing powder which produces hardly any dust is obtained. The copolymer can be dried in a conventional manner, and either the suspension obtained in the polymerization is used directly or the solvent-moist filter cake obtained after filtration is employed. Conventional drying apparatuses, such as drum dryers, belt dryers, paddle dryers, spray dryers or fluidized-bed dryers, can be used for this purpose.

The copolymerization is carried out in a conventional manner. The specific conditions depend on the intended molecular weight of the copolymer. If the desired copolymer is to have a low or medium molecular weight, it is advantageous$ initially to take a solution of the ethylenically unsaturated dicarboxylic anhydride in an aliphatic ester of not less than 5 carbon atoms, in particular isopropyl acetate, and to meter in the vinyl ether together with an initiator within a certain time. Preferably, the process is carried out at the boiling point of the ester, so that the heat evolved during the polymerization is removed by evaporative cooling. The molecular weight can be varied in a known manner by changing the concentration, the amount of the initiator, the feed times and the temperature. If copolymers having very high molecular weights are desired, the vinyl ether is not metered in but is likewise initially taken, and the initiator is metered in as the polymerization progresses. The simplest method technically is to carry out the process at the boiling point of the mixture, even in the case of the preparation of high molecular weight copolymers. The temperature can be varied within a wide range, for example from 30°to 150° C., preferably up to 120° C. The copolymerization can be carried out under atmospheric, superatmospheric or reduced pressure. By varying the pressure, it is thus possible to carry out the polymerization, for example with the aid of a single suitable ester, in the entire wide temperature range at the boiling point of the reaction mixture and to employ evaporative cooling. If methyl vinyl ether and maleic anhydride in a solvent, for example in the particularly preferred solvent isopropyl acetate, are initially taken in the copolymerization, the boiling point of the mixture slowly increases to the boiling point of the isopropyl acetate as the polymerization progresses, owing to the consumption of the low boiling methyl ether.

The polymerization is initiated using the conventional free radical initiators, for example acyl peroxides, such as diacetyl peroxide, dibenzoyl peroxide and dilauryl peroxide, peresters, such as tert-butyl perpivalate, and tert-butyl per-2-ethylhexanoate, peroxides, such as di-tert-butyl peroxide, percarbonates, such as dicyclohexyl peroxydicarbonate, and azo compounds, such as 2,2'-azobisisobutyronitrile, 2,2'-azobis-(2,4-dimethylvaleronitrile), 1,1'-azobis-(1-cyclohexanecarbonitrile) and dimethyl-2,2'-azobis-(isobutyrate). 2,2'-azobis-(2,4-dimethylvaleronitrile) is a particularly suitable initiator. The initiators are used in conventional amounts, i.e. from 0.01 to about 2% by weight, based on the total weight of the monomers used in the copolymerization. As described above, the copolymers can be isolated from the suspension. However, they can also be further processed in the form of the suspensions. The mean particle size of the copolymers is from 1 to 50 $\mu$m.

The copolymers are intermediates which have various uses. For example, reaction of copolymers of maleic anhydride and alkyl vinyl ethers with alcohols gives reaction products which are used as binders in hair sprays. Complete or partial neutralization of the stated copolymers with sodium hydroxide solution gives the corresponding sodium salts, which are used as additives in detergents, in amounts of from 1 to 10% by weight. The free acids of the copolymers, which are obtainable by hydrolysis in aqueous solution, and the alkali metal salts and alkaline earth metal salts of the copolymers, are used in toothpastes. Crosslinked copolymers, for example copolymers of maleic anhydride, methyl vinyl ether and butanediol diacrylate, are used as thickeners in textile print pastes. The copolymers have K values of from 10 to 150.

The K values stated were determined using 1% strength by weight solutions of the copolymers in cyclohexanone at 25° C. according to H. Fikentscher (cf. Cellulosechemie, 13 (1932), 48–64 and 71–74). $K=k.10^3$. In the Examples, parts are by weight.

EXAMPLE 1

In a stirred 2 l glass apparatus equipped with stirrer, a reflux condenser, cooled to -10° C. and having a drying tube, and a metering apparatus, 400 g of n-propyl acetate and 125.6 g of maleic anhydride were initially taken and stirred until the maleic anhydride had dissolved (about 15 minutes). Thereafter, a solution of 90 g of methyl vinyl ether in 350 g of propyl acetate was added. The resulting mixture was heated to the boil, while stirring. 6 ml of a feed solution consisting of 0.2 g of 2,2'-azobis-(2,4-dimethylvaleronitrile) and 50 g of n-propyl acetate were first added and initial polymerization was carried out for 20 minutes. The remaining feed solution was then metered in within 5 hours, the reaction mixture constantly being kept boiling gently. As early as the beginning of the feed, the start of polymerization was detectable from the resulting cloudiness. The snow-white suspension, which initially had a low viscosity, became more and more viscous with increasing reaction time. After the end of the feed, the mixture was stirred under reflux for a further hour. The resulting suspension was filtered under suction and the residue was dried at 50° C. under reduced pressure from a water pump. 195 g of a coarse-particled, snow-white powder which produced no dust were obtained. The K value of the copolymer was 76.

EXAMPLE 2

The procedure was similar to that in Example 1, except that butyl acetate was used instead of propyl acetate.

198 g of a coarse-particled powder which produced no dust were obtained. The K value of the copolymer was 64.

EXAMPLE 3

The procedure was similar to that in Example 1, except that isobutyl acetate was used instead of n-propyl acetate.

190 g of a very free-flowing powder which produced hardly any dust were obtained. The K value of the copolymer was 64.

EXAMPLE 4

The procedure was similar to that in Example 1, except that isopropyl acetate was used instead of n-propyl acetate.

198 g of a snow-white powder which produced little dust were obtained. The K value of the copolymer was 79.

EXAMPLE 5

In an apparatus as described in Example 1, 300 g of isopropyl acetate and 125.6 g of maleic anhydride were initially taken and were stirred until the maleic anhydride had dissolved (about 15 minutes). Thereafter, a solution of 90 g of methyl vinyl ether in 250 g of isopropyl acetate was added. The resulting mixture was heated to the boil, while stirring. A solution of 0.2 g of 2,2'-azobis-(2,4-dimethylvaleronitrile) in 50 g of isopropyl acetate served as the feed. 6 ml of this feed were added, and initial polymerization was carried out for 20 minutes, the beginning of polymerization being detectable after about 15 minutes from the cloudiness. The remaining feed solution was then metered in over 5 hours, the mixture constantly being kept boiling gently. The further procedure was similar to that of Example 1.

195 g of a pure white, very free-flowing copolymer which produced little dust were obtained. The K value was 91.

EXAMPLE 6

The procedure was similar to that in Example 5, except that maleic anhydride was dissolved in only 250 g of isopropyl acetate and the methyl vinyl ether in 170 g of isopropyl acetate. 201 g of a pure white, finely pulverulent copolymer which produced no dust were obtained. The K value was 98.

EXAMPLE 7

A solution of 125.6 g of maleic anhydride in 400 g of isopropyl acetate was prepared in an apparatus as in Example 1. A solution of 90 g of methyl vinyl ether and 350 g of isopropyl acetate served as feed mixture 1, and a solution of 0.8 g of 2,2'-azobis-(2,4-dimethylvaleronitrile) in 50 g of isopropyl acetate as feed mixture 2. The initially taken mixture was heated at the boil, and 50 ml of feed mixture 1 and 6 ml of feed mixture 2 were added. Initial polymerization was carried out for 20 minutes, the beginning of polymerization being detectable from the appearance of cloudiness, after which feed mixture 1 was metered in over 4 hours and feed mixture 2 was metered in simultaneously in the course of 5 hours, the reaction mixture constantly being kept boiling gently. After the end of the feed, the reaction mixture was stirred under reflux for a further hour. The resulting suspension was dried in a paddle dryer at 80° C. under reduced pressure from a water pump. 203 g of a pure white, free-flowing copolymer which produced no dust were obtained. The K value was 48.

We claim:

1. A process for the preparation of a copolymer of ethylenically unsaturated dicarboxylic anhydrides and alkyl vinyl ethers by copolymerization of
    (a) an ethylenically unsaturated dicarboxylic anhydride of 4 to 6 carbon atoms,
    (b) methyl vinyl ether or a mixture of methyl vinyl ether with up to 10 mol %, based on the mixture, of other alkyl vinyl ethers and
    (c) from 0 to 2% by weight, based on the monomers (a) and (b), of a crosslinking agent containing two or more ethylenically unsaturated double bonds, in the presence of a polymerization initiator in a medium consisting essentially of an ester of not less than 5 carbon atoms which is obtained from a saturated aliphatic carboxylic acid and a saturated monohydric alcohol, wherein the monomers are soluble in the ester and the resulting copolymer is virtually insoluble therein.

2. A process as claimed in claim 1, wherein the ester has a total of 5 or 6 carbon atoms.

3. A process as claimed in claim 1, wherein the solvent used for the monomers is an ester of acetic acid and a saturated monohydric alcohol of not less than 3 carbon atoms.

4. A process as claimed in claim 1, wherein the solvent used is isopropyl acetate.

5. A process as claimed in claim 1, wherein the solvent used is n-propyl acetate.

6. A process as claimed in claim 1, wherein
   (a) maleic anhydride and
   (b) methyl vinyl ether are copolymerized in isopropyl acetate.

* * * * *